(12) United States Patent  
Langbauer (10) Patent No.: US 6,915,733 B1  
(45) Date of Patent: Jul. 12, 2005

(54) PREPARATION DEVICE AND BAG FOR INFUSIBLE BEVERAGES AND METHOD FOR THE PREPARATION OF THE SAME

(76) Inventor: Werner Langbauer, Schlossstrasse 5, D-83355 Grabenstätt (DE)

( * ) Notice: Subject to any disclaimer, the term of this patent is extended or adjusted under 35 U.S.C. 154(b) by 0 days.

(21) Appl. No.: 10/088,287

(22) PCT Filed: Sep. 15, 2000

(86) PCT No.: PCT/EP00/09043

§ 371 (c)(1), (2), (4) Date: Apr. 14, 2003

(87) PCT Pub. No.: WO01/21049

PCT Pub. Date: Mar. 29, 2001

(30) Foreign Application Priority Data

Sep. 17, 1999 (DE) .......................................... 199 44 605  
Jun. 7, 2000 (DE) .......................................... 100 27 766

(51) Int. Cl.[7] .............................................. A47J 31/00
(52) U.S. Cl. ........................... 99/319; 99/295; 426/433
(58) Field of Search ........................ 99/318, 319, 317, 99/295; 426/79, 77, 70, 433

(56) References Cited

U.S. PATENT DOCUMENTS

| | | | | | |
|---|---|---|---|---|---|
| 793,655 A | * | 7/1905 | Haley | ........................... | 99/319 |
| 2,302,698 A | * | 11/1942 | Kessel | ........................ | 422/99 |
| 2,562,433 A | * | 7/1951 | Moore | ........................ | 99/319 |
| 2,716,607 A | * | 8/1955 | Waline | ........................ | 426/79 |
| 3,279,351 A | * | 10/1966 | Cohn | ........................... | 99/282 |
| 3,345,935 A | * | 10/1967 | Waline | ........................ | 99/295 |
| 3,692,536 A | * | 9/1972 | Fant | ........................... | 426/79 |
| 4,365,544 A | * | 12/1982 | Howitt | ........................ | 99/297 |
| 5,027,696 A | * | 7/1991 | Antonini | ...................... | 99/279 |
| 5,647,055 A | * | 7/1997 | Knepler | ...................... | 392/451 |

* cited by examiner

Primary Examiner—Reginald L. Alexander  
(74) Attorney, Agent, or Firm—Dority & Manning (57) ABSTRACT

This invention is a device for the production of beverages made by the addition of water as described, in particular brewed hot beverages, such as soups etc., and in particular tea or coffee, whereby the invention comprises a liquid tank and a movable screen basket which holds the material used for the infusion, whereby the gap between the screen basket and the inside wall of the tank in the direction of movement of the screen basket is such that when the screen basket is moved, essentially the entire volume liquid in the tank flows into the screen basket with the aim of achieving a targeted flow of liquid through and around the material which is being infused. A process is provided for the production of beverages made by the addition of water, in particular brewed hot beverages, or soups etc., whereby the quantity of liquid in the tank is measured before the production process begins, the liquid in the tank is heated or cooled to a set temperature and the appropriate brewing or infusion time is calculated dependent on the measured quantity and/or temperature of the liquid and/or the nature of the beverage being produced.

32 Claims, 4 Drawing Sheets

PREPARATION DEVICE AND BAG FOR INFUSIBLE BEVERAGES AND METHOD FOR THE PREPARATION OF THE SAME

FIELD OF THE INVENTION

The present application concerns a device and a sachet for the preparation of drinks made by the addition of water to a base, particularly drinks such as tea or coffee, soups etc. Made by adding hot water or other quickly soluble or immediately soluble drinks and liquids. The device includes a receptacle for the liquid containing a screen basket for the material of which the drink is to be made which can be traveled, preferably vertically but also rotated, and also a procedure for preparing drinks by adding water to a base material, particularly drinks made by pouring on hot water. Alternatively, the process can also be used to enable the preparation of cold drinks and chilled liquids.

BACKGROUND

A device for brewing tea is familiar from DE 196 05 067 A1. The purpose for which this device was intended is the brewing of tea in a concentration suitable for immediate consumption and exclusively on a large scale, with no loss of aroma. The tea thus brewed is intended for subsequent filling into bottles or drink packaging or similar receptacles. Other flavoring components, for example fruit juices, are mixed with the tea.

The brewing of tea "on a large scale" is understood to be a volume of approximately 8000 to 10,000 liters made with approximately 160 to 200 kg of tea mixture. As described in this present application, a tank is filled with 8000 to 10,000 liters of hot water. The tea mixture (160–200 kg) is positioned in an insert in a screen basket. Once the tank has been filled, the screen basket with the insert is lowered to the floor of the tank and raised and lowered the full height of the tank over the duration of the brewing period. Subsequently, the tea is filled into containers. In particular, the intention is to cool the tea thus brewed and to bottle it directly in the chilled state. Alternatively, the tea, once it has cooled, is added to a drink mixture to form a ready-to-serve drink before it is bottled. In this case, fruit juice concentrates, flavorings and water are usually also added to the tea after it has been filtered.

The large scale technical design of this device makes it quite unsuitable for use in small catering systems, in the office or in the household, where the preparation of individual cups or of quantities from 1 to approximately 10 liters is required. The present application—unlike that declared in DE 196 05 067 A1—aims to provide, for example, a hot and fully aromatic tea for individual tea drinkers or small groups of tea drinkers. It is, for example, particularly important that green tea be prepared with the utmost precision and care. The temperature of the water used should be approximately 80° Celsius to ensure that the active ingredients and the aroma of the tea leaves are released to their fullest effect. If boiling water is used, the level of bitter principles increases significantly, which means that green tea loses a large amount of its health-promoting qualities. It also has a very detrimental effect on the taste.

Above and beyond this, there are numerous automatic machines for brewing coffee and tea which are fully unsuited for use in the preparation of such beverages, and particularly green tea, in small catering systems. Persons attending conferences, seminars etc. still have to prepare their tea themselves using a tea bag and pouring on hot water which is provided in thermos flasks.

SUMMARY OF THE INVENTION

Regarding these technical requirements, it is the object of the present application to provide an automatic means of making beverages of various kinds, for example, diverse kinds of tea (e.g. Green tea, herbal teas etc.), particularly in the catering trade or small catering systems, but also for office or household use, quickly and with optimum development of the extracts used, and also to increase the exploitation of the substances used (e.g. Tea leaves). A further aim is make it possible to provide varying quantities of brewed beverages depending on requirements. There is also a proposed brewing sachet which would mean simpler portioning and flooding of the infusible product, so that even, for example, open tea, could be easily prepared in premium quality.

The advantageous features of this application are described in the subsidiary claims. Additional objects and advantages of the invention will be set forth in part in the following description, or may be obvious from the description, or may be learned through practice of the invention.

The device for the production of hot or cold drinks or soups made by the addition of water, in particular of tea and coffee, has a container for liquid and a movable screen basket to accommodate a substance to be filtered.

The characteristic feature of this application is that the gap between the screen basket and the inner wall of the container is such that when the screen basket is moved, all the liquid in the container passes into the screen basket or even passes more or less completely through the screen basket, which is advantageous as it allows the substance to be filtered to be washed through or soaked in a targeted manner. The object of the application is to produce a machine for the production of beverages which allows liquid to flow optimally around, for example, green tea, but also any other kind of tea and any other substances infused in this way, thus permitting the release of the flavorings and health-promoting substances from the leaves within the shortest possible brewing or infusion time and as effectively as possible. In addition, for example, it enables the preparation of a tea of high quality with a very small quantity of tea leaves, which has the added advantage of improving the cost-benefit ratio.

In contrast to the above-mentioned state of the art which aims at large-scale production of tea, the present application allows a very good utilization of the tea leaves by means of optimum soaking of or flow of the water around the tea leaves. To allow the liquid in the container (from 1 to approx. 10 liters) to release the flavoring from the tea leaves as effectively as possible, all the liquid in the container is passed through the screen basket as it moves. To this end, the device has been designed in such a way that the lateral gap between the screen basket and the inner wall of the container is very narrow.

In contrast, the state of the art (DE 196 05 067 A1) shows a gap of at least 5 cm to 10 cm between the screen basket and the inner wall of a tank holding approximately 8,000 liters. The width of this gap prevents optimum utilization of the tea leaves, as liquid still passes and must pass through this gap in order to move the screen basket. This gap on all sides is absolutely necessary, as the screen basket, containing as it does 160 kg to 200 kg of tea, could not otherwise be moved through the tank without great effort. As the heavy screen basket is moved upwards and downwards in the tank, the liquid rushes through this gap in a turbulent and flood-like movement, since, for example, when the screen basket is raised, the tea leaves inside it are compressed and water can no longer pass through the screen basket, as the apertures in the screen basket are blocked by the layers of tea leaves pressing against them. Above and beyond this, the state of the art makes no provision for optimum 'use' of the tea leaves. Here, there can be no question of allowing the flavor of the tea to develop fully, as the tea is to be mixed with another fruit juice after production. As a rule, the teas used for such tea/fruit juice mixtures are not of particularly high quality.

The screen basket can be moved inside the container, for example in a linear movement, for preference vertically, or around a rotational axis, which for preference should be vertical. The design of the screen basket is such that the liquid can pass through it easily and is washed intensively around the tea or other material with which a beverage is to be,produced. If the material to be infused (e.g. Tea) is loose in the screen basket, its resistance to the flow causes it to be swirled around, and the upward movement of the screen basket presses the tea against the floor of the screen basket. This ensures a particularly economical use of the infused material. If, on the other hand, the material to be infused is in a sachet in the screen basket, this effect is not so marked, but it is easier to dispose of the residue after brewing and it is much easier to clean the basket. If the screen basket is pivot-mounted on a vertical axis, and if in particular it describes continual, changing or alternating rotational movements and the screen basket or the insert are also shaped in such a way that the water can flow optimally through the material to be infused (for example if they are shaped like the segment of a circle), a good exploitation of the material to be infused is also ensured.

In comparison with the present application, the device shown in DE 196 05 067 A1 contains so much tea material in the transport medium with such a high dead weight that the material to be infused is not sufficiently rinsed by the liquid, as the great mass presses the tea leaves together and crushes them.

In a further development of the invention, a seal, preferably running around the whole circumference, is fitted across the gap between the screen basket and the inner wall of the container. This seal ensures that almost all of the water passes through the screen basket and means better utilization of the tea leaves.

To ensure that almost the entire liquid flows through the screen basket, there is a sealing device in the upper and/or lower part of the screen basket. Due to its elasticity, this sealing device or a sealing lip may compensate for any unevenness in the container wall so that practically all the water flows through the screen basket.

To achieve the object of providing a fast and efficient production of drinks made by adding liquid to a base material, equipping the device with a drive or hydraulic mechanism to achieve targeted or controlled movement of the screen basket is suggested. A hydraulic mechanism makes a predetermined linear movement of the screen basket possible, preferably in vertical direction, which, compared with the state of the art, has the added advantage of greater mechanical stability and reliability. The robust nature of the hydraulic mechanism means that the device is well suited for use in small catering systems. In addition, it allows easier set-up of, for example, a tea or coffee machine.

As a drive system, a motor, in particular an electric motor could be used to move the screen basket by means of a crank or a spindle, i.e. To raise, lower or rotate the screen basket. The screen basket can be rotated in one direction or in alternating directions.

To prevent materials which have a negative effect on the taste, for example oil from an oil-powered hydraulic mechanism, polluting the beverage, the hydraulic mechanism may, for example, be water-powered. This has the added advantage that water is a very inexpensive medium.

A further development of the application is the water-operated hydraulic mechanism which is attachable or attached to a water supply. The hydraulic mechanism could for example, be attached to the normal water main supply provided in buildings. The water pressure of a household main supply is sufficient, so that the infusion device can be set up and operated anywhere.

If the side walls of the screen basket are, in addition, of a design which does not allow water to pass through, the flow of liquid will be directed exclusively through the screen basket when the latter is traveled. The sides of the basket could also be of sieve-like design, allowing water to pass through. Here, the sealing device should for preference be fitted on the underside of the screen basket to ensure that the liquid is forced to flow through the screen basket.

It is also possible for the screen basket itself to have compartments, particularly in a vertical direction, that is, in the direction of the flow, but also in a horizontal direction. These would contain the infusion material (e.g. Tea). The division into separate compartments ensures that the material is distributed evenly and that it does not become compressed during the infusion process. This means better utilization of the tea. The compartments can also be distributed in such a manner that, for example, several sachets with material for the beverage can be arranged separately and/or over or next to each other like in drawers on separate levels within the screen basket. Ideally, the separating walls for the compartments will have apertures or be shaped like grilles in order to ensure that the infusion medium (chiefly water) flows unobstructed through the screen basket.

The screen basket is designed as a construction closed in such a way that the material to be infused cannot escape from the screen basket and float around in the liquid. It would be practical for the screen basket holding the infusion material to be cylinder-shaped and for the upper and lower surfaces to be grilles or have apertures to allow the liquid to flow through. The side walls of the screen basket can be solid surfaces to prevent liquid streaming in when the screen basket moves upwards and downwards. This is particularly advantageous for the preparation of beverages using relatively large quantities of material. If the device is used in the office or the household, it may be sufficient to simply have a screen basket without a lid. The movement of the screen basket must then be controlled in such a way as to prevent the upper edge of the screen basket sinking below the surface of the liquid, so that unfiltered material cannot get into the liquid which is later drained off from the tank.

It is of particular advantage if the device is provided with a control system which controls production of the beverage according to the quantity of liquid and/or the temperature of the liquid and/or the variety of tea and/or the brewing time. This semi- or fully-automatic control system allows perfect timing when producing, for example, tea and with almost total extraction of the effective ingredients of the tea for a given sort of tea. For example, the water for the tea can be heated to the perfect temperature for optimum extraction of the flavoring substances for the given variety of tea and for the amount of water used. The screen basket can, for example, be moved up and down along a path and in a direction set via the control system. Additionally, the optimum brewing time for the water temperature and the variety of tea used is set fully automatically.

To allow individual setting for the preparation of a preferred beverage, the control device in a further development of the application can be programmed or operated manually. In this way, each individual using the device can select and program the parameters, for example for a preferred tea (quantity, variety, temperature), by entering them (digitally) or by means of turning knobs. The control system also features a cleaning program for cleaning and decalcification of the tank or the system. It is also possible to enter individual settings, for example for particular varieties of tea, thus programming the device and presetting these parameters. The device can thus feature a menu-prompted, e.g. LAD text display, control system for easy operation.

By means of the control system, for example, the lifting movement of the screen basket during the brewing process can be selected so that for a pre-selected quantity of liquid, the floor of the screen basket is located in the area of the surface of the liquid when the basket reaches its upper reversing point. This means that, for example, the screen basket does not have to run through its full course if the amount of liquid used is lower than the maximum, which would lead to an incorrect brewing time. Above and beyond this, smaller quantities of the beverage can be prepared as quickly as possible in this way.

To ensure optimum heating of the infusion medium before the infusion process is started, there is provision for a heating system, for preference on the floor of the tank. To prepare, for example, tea, the tank is filled with cold water, which is subsequently heated. In contrast, DE 196 05 067 A1 shows a design whereby, before making tea, a tank holding approximately 8,000 liters is filled with hot water. Heating water in such a large receptacle poses a considerable technical challenge for large-scale production and is therefore not planned in this case. The application is such, however, that the tank can be filled with cold water, which can then be heated quickly and easily, e.g. By means of one or more heating elements on the floor and/or walls of the tank or by means of some other heating system. This means that the infusion medium (e.g. Water) is heated and the infusion (e.g. Tea) prepared in one and the same container. In order to reduce heat loss to a minimum, the entire device and/or the tank is insulated. To facilitate quick emptying of the tank, it can be cone-shaped, at least in the floor area. This also makes it easier to clean, as residue cannot accumulate in comers. Alternatively or in addition to the heating, a cooling system can be installed, for preference in the upper area of the tank walls. In this way, hot and/or cold drinks could be produced in one device.

The device is also equipped with a temperature sensor which measures the temperature of the liquid in the tank. Some varieties of tea, for example, do not require boiling water. Green tea, for example, develops its health-promoting ingredients and its flavor best at a temperature of approx. 80° Celsius. Green tea made with boiling water (100° Celsius) contains a considerably higher proportion of bitter principles. This impairs the taste of the tea. The temperature sensor is ideally linked with the control system, to which it reports the temperature of the tea water, allowing quick, easy and gentle preparation of green tea with this application.

The tank can be closed, preferably with a lid, to ensure that the beverages, once they are ready for pouring, remain warm or cold. In addition, it prevents foreign bodies, insects etc. Getting into the tank and provides protection against possible splashing with boiling water.

Furthermore, it is particularly advantageous for the device to be fitted with a sensor which monitors whether the lid is closed. This sensor acts as a further safety device, appropriate in view of the fact that the tank may be used to produce large quantities of boiling water or other hot liquids. If the lid of the tank is not securely fixed, the control system will prevent the initiation of the production process. The infusion medium is only heated if the lid is properly fixed.

The device can also be fitted with a display or LAD text display to good advantage. It would be advantageous to enable automatic activation of such a display once the beverage is ready to drink, so that it shows that the beverage, for example tea, is now ready to be poured. In the same way, it would display for the operating personnel the status of the brewing time and/or the quantity of the infusion medium (preferentially water) and/or the kind of material being used (e.g. The variety of tea). In the same way, the user could also be told by means of a kind of menu control or prompting system what operating steps now have to be carried out on the machine or informed of any faults which have occurred.

This display could also comprise a lamp, an LAD text display and/or another signal element (e.g. Speaker etc.). The device's fully automatic control system ensures that the drink is allowed to infuse for precisely the right length of time, freeing attendant personnel to carry out other tasks in the meantime. Once the correct brewing time has elapsed, personnel are alerted to the fact that the infusion (e.g. The tea) is ready by means of an optical signal (lamp) and/or an acoustic signal.

The device is fitted with a mounting bracket for the tank to facilitate positioning above a pot or other receptacle (e.g. Cup) into which the finished drink is to be poured.

It would also be of particular advantage to fit the device with a sensor measuring the weight or quantity of the liquid in the tank. This weight or quantity sensor would detect the precise amount of tea water or other infusion medium, allowing the control system to adapt the production process to the quantity of liquid and/or the material in question (e.g. The variety of tea) etc.

Another very advantageous further development of the application would be to fit a sensor to measure the quantity of liquid in a design with a strain gage, for preference in a mounting bracket for the tank. These strain gages measure the level of the liquid precisely, both while the tank is filled with the infusion medium and while the finished beverage is drained off. Before filling the tank, automatic zero-point setting is generally carried out electronically. This is a particularly advantageous and ingenious method of determining the exact amount of liquid in the container without having to measure the exact flow during filling or draining. The strain gages are accommodated in a practical manner in one of the mounting brackets of the tank.

In this application, a weight measuring device is adjusted before the tank is filled. The quantity and/or the weight of the infusion medium flowing into the tank is registered by the measuring device and the information passed on to the device's control and regulating unit. Before the tank is filled with the infusion medium, zero point setting or adjustment is carried out. The measuring device can consist, for example, of a device with strain gages fitted on the tank or on the mounting bracket of the tank. Thus it is possible to monitor the exact amount of liquid present. Furthermore, the heating system cannot be activated unless there is liquid in the tank.

The weight measuring device can also be used to ascertain whether liquid has been removed from the tank, so that the heating or cooling device is switched on or off.

It is also possible, after removal of some liquid, to ascertain the amount of liquid remaining in the tank, for example by means of the weight measuring device. The amount of liquid remaining can, for example, be shown on a display, informing attendant personnel how much tea or other liquid remains in the container. Alternatively, the amount of liquid which has been added to or removed from the container can be ascertained via flow measurement devices.

For this application, a process is also suggested by which the amount of liquid required to make the beverage is determined and the container then filled and/or the amount of liquid poured into the tank is ascertained, the liquid in the container is heated/cooled to a preset temperature and the appropriate infusion and brewing time ascertained, depending on the measured quantity and/or the temperature of the liquid and/or the nature of the beverage to be prepared. This would enable beverages made by the addition of water (such as tea) to develop their full taste and aroma, while preparing them using an especially advantageous and gentle method. The individual parameters relevant for optimum results can either be programmed, for example by storing parameters found in practice to be good and subsequently calling them up as required from a menu or they can be entered individually by the operator. The device can also propose parameter settings for each process. These can then either be acknowledged or altered by the operator.

In addition, it is also advantageous to preset the path the screen basket follows, depending on the amount of liquid selected and/or measured and/or the temperature of the liquid and/or the nature of the drink to be prepared. If the tank is not completely filled with the infusion medium, for example, the path of the screen basket will be shorter than if the liquid was at maximum level. This ensures that the infusion material (e.g. The tea leaves) can still develop their full aroma even if a relatively small amount of the beverage is being produced, as the infusion material is then always kept immersed in the liquid and the liquid flows through it constantly.

In the case of the preparation of warm tea, for example, the control system registers whether liquid has been removed from the tank once the drink has been prepared, and this information and/or information on the current temperature of the tea will cause the heating system on the tank to be switched on or off. This means that there is a constant supply of warm tea ready to be poured. If the beverage is not poured from the tank or until such a time as the entire contents have been poured, the remaining tea is maintained at a constant preset temperature. If necessary, the heating system is switched on or off. In an analogous manner, cold drinks are maintained at a constant temperature by means of a cooling system on the tank.

In a further development of the application, a sensor monitors whether the tank is closed before the liquid is heated, thus ensuring that operating personnel are not in danger of being splashed with, for example, hot water from the tank. This also protects the infusion medium from contamination.

It is also of advantage for the screen basket with the infusion material to be removed from the liquid once the beverage is ready and for an optical and/or acoustic signal to be given to indicate that the process has been completed. This is practical as a means of informing attendant personnel who have been busy with other tasks while the infusion process has been running that the beverage (e.g. The tea or coffee) is now ready to serve. Removing the screen basket from the liquid ensures that the taste is not impaired due to further liquid running through the infusion material. In the case of green tea, for example, this would simply mean the release of more bitter principles and that the taste of the tea would thus be affected negatively, even to the point of ruining it.

It would also be practical for the operating personnel if the remaining time left until the beverage is ready were displayed while the process is running. This information would inform them when the beverage will be ready to be poured and served, thus enabling them to decide whether there is sufficient time to carry out other tasks in the meantime.

Furthermore, it would also be practical to move the basket with the infusion material through the liquid by means of a water-operated hydraulic system. Such a system could be connected up to the existing water supply in the building. This hydraulic system also has the advantage that substances such as oils or greases cannot affect the taste of or spoil the beverage.

Furthermore, a sachet to hold infusion material, in particular brew able hot and cold beverages or soups etc., and in particular tea, coffee, is designed in such a way that the sachet is subdivided into several chambers particularly suitable for flooding laterally. The chambers allow even distribution of the tea or other infusion material and prevent accumulations of tea or infusion material while the beverage is being produced. This means that the infusion material is better flooded and exploited, whereby it is not necessary for the chambers to be completely separated from each other. Overall, the aim is a homogeneous distribution.

In a further development, the sections are fully separated from each other. The separation can be achieved by seams and/or adhesion and/or attachment and/or perforation and/or pressing. In addition, individual chambers of the sachet are detachable and/or separable. Thus, for example, trend-oriented flavor blends can be produced in one and the same brewing process, for example for tea. Two separate half sachets, each containing a different selected tea, or, of course, four quarter sachets containing four different teas, can be placed in the equipment at the same time. The sachet or the chambers consist of a permeable material—paper, netting, fleece, fabric, cellulose products or similar materials are particularly suitable, having the decisive advantage that the infusion material can be removed from the machine easily and without causing soiling. This is an important advantage in the catering trade, where it is important that the device can be cleaned quickly.

If the sachet is essentially the same shape as the flooded cross-section of the basket, it would suffice to place the corresponding number of sachets in the device (e.g. 3 two-liter sachets for 6 liters of tea) and start the brewing process.

Disposal of the sachets is very simple and there is optimum flow of water around and through the infusion material. It would even be possible, for example, to re-use sachets containing premium quality teas. Thus, the same quantity of infusion material could be exploited several times. In the case of green tea, the health-enhancing properties of the beverage would be increased, e.g. In medicinal applications.

The application for the preparation of, for example, tea, allows the individual and automatic preparation of different varieties and flavors of tea in the catering trade, in the office and in the household. In spite of the fact that the process is automated, the beverages produced have full flavor and aroma, and the process is gentle and effective. The preparation of green tea, for example, requires precision and care. These requirements are fulfilled by this application.

The sachets could be provided with apertures and/or segments with apertures to allow a better flow of liquid through the sachet. These apertures, a sort of forced duct, would lower the flow resistance during the upward and downward movement of the basket with the sachet, in particular when the infusion material has already become swollen with liquid.

The following sample applications of the device provide further information.

DETAILED DESCRIPTION

Reference will now be made in detail to embodiments of the invention, one or more examples of which are shown in the drawings. Each embodiment is provided by way of explanation of the invention, and not as a limitation of the invention. It is intended that the invention include modifications and variations to the embodiments described herein.

Figure 1:
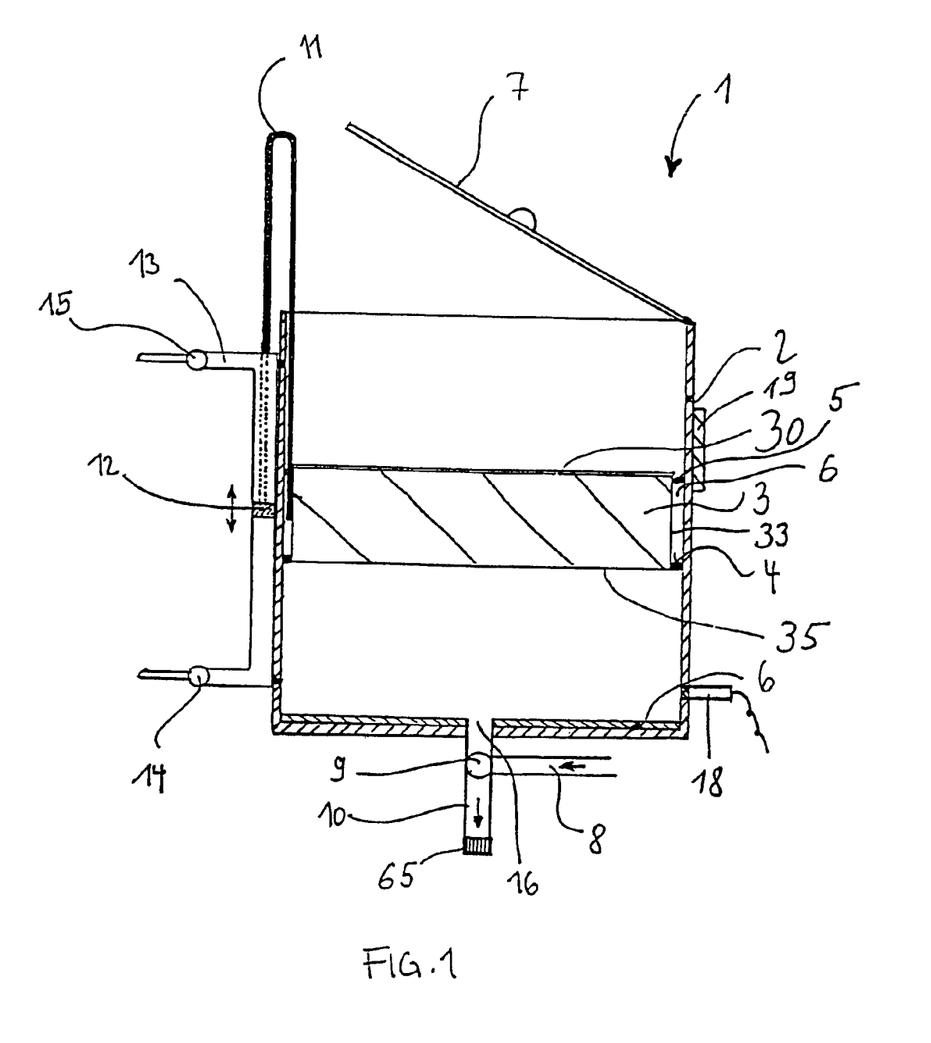
FIG. 1 shows a vertical section through the invention for the preparation of beverages made by infusion.

FIG. 1 shows a tea machine 1 with a tank 2 containing a screen basket 3. The tank 2 also has a lid 7, which is pivot-mounted. Alternatively, the lid 7 can be placed on the tank 2 by hand. In the area of the floor of the tank 2, there is a heating system 6, which can consist, for example, of heating coils or other heating elements fitted onto the outside or inside of the floor and/or the side walls of the tank. As an alternative to or in addition to the heating system, there may also be a cooling system 19, fitted for preference in the upper region of the side walls. The tank 2 is of basically cylindrical design and made, for example, of steel. The floor at least can be cone-shaped, either on one side or symmetrically (see FIG. 4). This makes it easier and quicker to drain the liquid from the tank 2 and to clean the tank 2.

To facilitate cleaning, the tank 2 can have a rounded bottom and can, for example, have rounded edges on its circumference. Moreover, the tank 2 can be insulated to prevent energy leaking too quickly to the surroundings.

Figure 2:
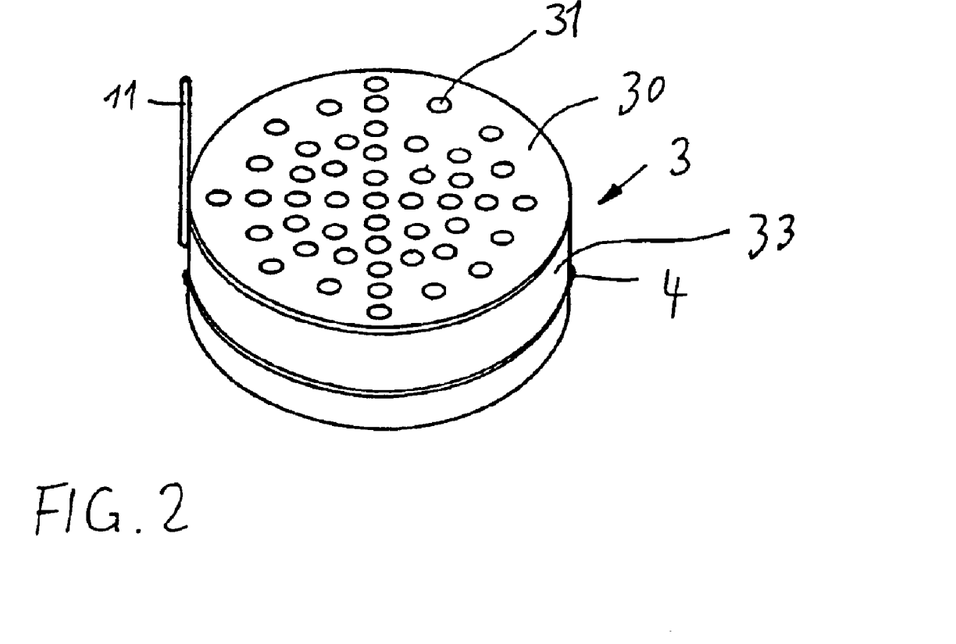
FIG. 2 shows a screen basket with lid shown in perspective.

The screen basket 3 has closed sides 33 and a grille-like design on the upper and lower surface 30, 35 with apertures 31 and 32. A ready made-up portion of infusion material is placed in the screen basket 3. As the screen basket 3 is traveled up and down, the infusion medium flows around and through the screen basket 3. Generally, it can be said that the flavoring substances are almost completely released from, for example, the tea leaves in this method of preparation. For preference, the infusion material should be in one or more of the infusion sachets to be described hereafter. In FIG. 2, the upper surface is in the form of a detachable lid 30. This prevents the infusion material being washed out of the screen basket 3.

Alternatively, the screen basket 3 can also have a fine, sieve-like structure on the bottom or also on the top. This would mean that this screen basket could be used, for example, for loose tea or coffee which has not already been made up into portions. In the open-topped version of the screen basket (for example FIG. 3), the special feature is that the process can be controlled in such a way, for example by means of micro-processor control or with the aid of mechanical stops, that the upper edge of the screen basket is not submerged under the surface of the liquid, to prevent unfiltered infusion material getting into the liquid. This applies chiefly when using the device to prepare small amounts of a beverage (e.g. 1.5 liters), as would be the case, for example, in the household or offices.

Figure 3:
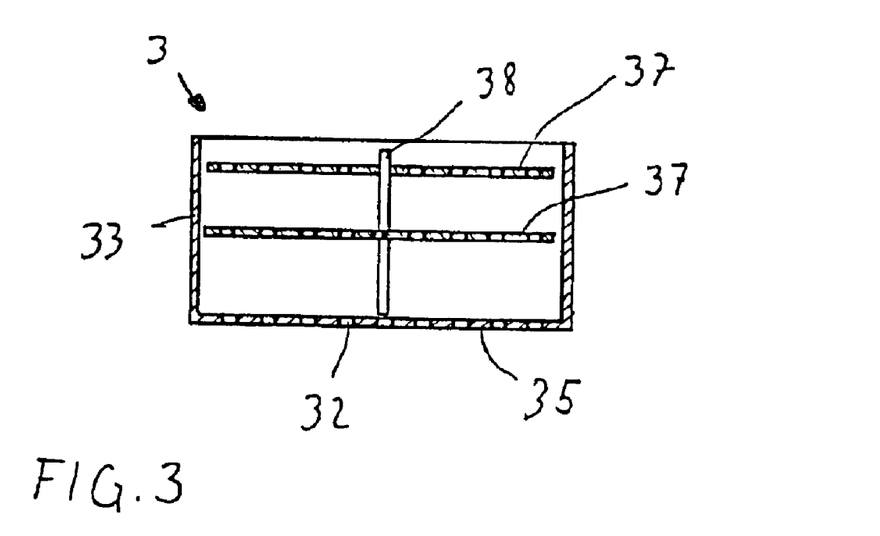
FIG. 3 shows a screen basket without lid and with an insert with horizontal and vertical compartments.

In a further development of the screen basket 3 illustrated in FIG. 3, it has several separate compartments for the infusion material, so that the screen basket has several levels of compartments arranged over and/or next to each other and which the liquid flows through. The infusion material (e.g. Tea) can thus be precisely portioned for the quantity of water, for example in infusion sachets (one or more), providing for a very economical use of the tea or other infusion material. The separate compartments mean that distribution is even and prevent the accumulation of large clumps of infusion material, which the liquid could not then flow through efficiently. The separation is affected by means of an insert with horizontal and/or vertical divisions 37, 38 placed in screen basket 3.

Alternatively, for quicker and particularly simple removal of the used tea leaves or other infusion material, a woven net with the same amount of tea leaves can be placed in the screen basket 3.

The lateral gap between the tank 2 and the side of the screen basket 3 is fitted with a seal 4,5 which can in principle be fitted at any height on the side wall of the screen basket 3. The seal 4, 5 can, for example, take the form of a sealing lip running around the entire circumference of the screen basket. Seal 4, 5 could be made of an elastic, for example rubber-like material. In an alternative model of the application, there can be a number of seals on the screen basket 3. However, it may also be that due to the extreme narrowness of the gap, no seal is fitted between the side wall 33 of the screen basket 3 and the inside wall of the tank 3, although this means that the liquid mainly flows through the screen basket 3 itself.

On the floor of the tank 2, there is an aperture 16 with a valve 9, through which the infusion medium, for preference water can be fed in from a water mains feed 8 when the valve 9 is positioned correctly. The infusion medium is fed into the tank 2 via feed 8. Once there is a certain quantity of water in the tank 2, aperture 16 is closed via valve 9. Then the heating system 6 heats the liquid in tank 2. As an alternative to or in addition to the heating system 6, a cooling system 19 can be installed, for preference in the upper area of the side walls.

It is also possible to install a separate feed and outflow on tank 2. A sieve 65 can also be fitted to the drain itself to filter off suspended particles etc. And to allow the liquid to be poured out without splashing.

A temperature sensor 18 registers the temperature of the liquid. When a preselected or preset temperature is reached, the heating system 6 (or the cooling system 19) is switched off, and the screen basket 3, which was positioned completely or e.g. Depending on the program or product completely or partially above the surface of the liquid, is now lowered into the infusion medium.

Moreover, the temperature of the liquid and the tank 2 can be monitored by means of a thermostat in or on tank 2.

In addition, a sensor can be fitted on tank 2 to detect whether the lid 7 is closed and the tank 2 sealed. Only then is the infusion medium heated, thus averting danger to the operating personnel which would occur if liquid were boiled with the tank open.

When the infusion has been prepared, the screen basket 3 is raised out of the liquid and positioned in the upper part of the tank 2. An optical and/or acoustic signal, for example an LAD text display 60 and/or signal lamp 63 (FIG. 4) informs operating personnel that the beverage is ready. Using valve 9, the beverage can now be drained off at outflow 10 into pots or cups, preferably in fixed quantities. For this process, it is an advantage if the outflow 10 is positioned above the receptacle to be filled. For this reason, tank 2 can be mounted on the mounting bracket 61 of a frame with housing which can take more or less any form and which is only sketched in roughly in FIG. 4.

Furthermore, it is possible to monitor whether any of the finished beverage has been removed from the tank 2, using sensors and an appropriate control system. If no beverage is poured from the tank into pots or cups for some time, the control system can turn on the heating 6/cooling system 19 to keep the liquid warm/cold for a longer period of time.

For example, to make a beneficial and aromatic tea with a relatively small amount of tea leaves and a relatively high quantity of water (optimized cost-benefit ratio), the screen basket 3 is traveled vertically up and down inside tank 2. The seal 4, 5 around the circumference, the sealing lip on screen basket 3 or a correspondingly narrow gap 6 between the screen basket 3 and the tank 2 means that the entire volume of liquid or flow of liquid which is caused by the vertical movement of the screen basket 3 passes more or less exclusively through the surface of the screen basket 3 shown in cross-section, thus creating an optimum flow of liquid around and through the tea leaves in the screen basket 3.

There is a U-shaped bar 11 mounted on the side of the screen basket 3. This bar protrudes beyond the tank 2 and is moved by means of a water-powered hydraulic system. The other end of the bar 11 is equipped with a piston 12 which moves in a linear fashion inside a cylindrical tube 13. On the top and bottom of the U-shaped tube 13, there are solenoid valves 14, 15 connected to a (conventional) water supply. The cylindrical tube 13, the piston 12 and the valves 14, 15, which can, for example, be connected to a conventional mains supply, together form a water-powered hydraulic system which moves the piston 12 vertically, depending on the position of the valves 14, 15. As a result of the movement of the piston 12, the screen basket 3, which is attached at the other end of the bar 11, is also raised and lowered vertically.

The screen basket 3 is traveled up and down continually several times, over a period which is preset by the control system and which varies depending on the brewing time accorded for the different varieties of tea. This ensures that the aroma and the effective ingredients of the tea leaves /ground coffee are released as fully as possible.

Tea machine 1 is equipped with further sensors to measure the quantity or weight of the liquid and which should by preference be connected to the central control system. One or more strain gages 62 are attached to tank 2 for this purpose. These elements allow precise monitoring of the level of liquid in the tank 2. In addition, these gages 62 allow automatic zero-point setting before the receptacle 2 is filled. The quantity of liquid (usually water) has a significant influence on the infusion process.

Figure 4:
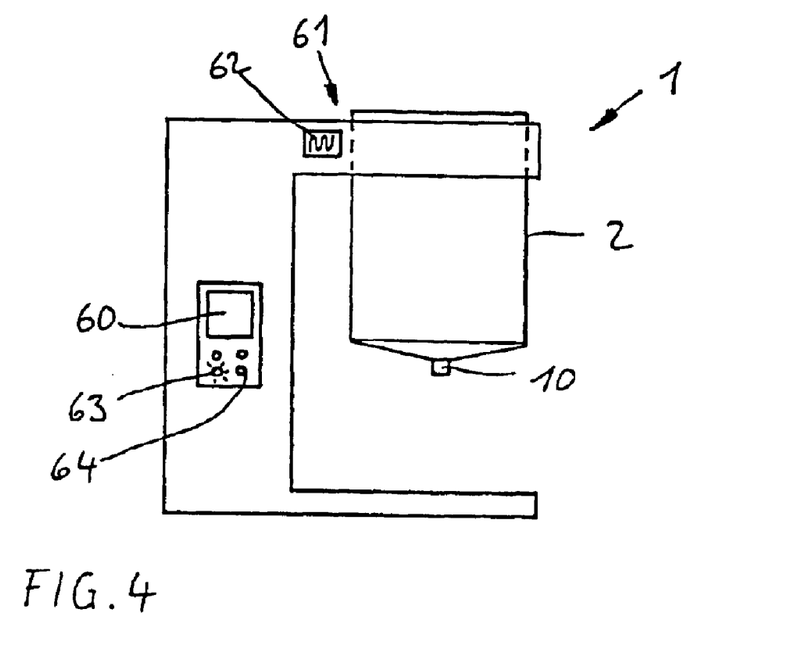
FIG. 4 shows a sketch showing a possible installation of the application, side view.

As a further development, the strain gages 62 can also be mounted on a bracket 61 (e.g. Supporting frame, mounting bracket) for the device 1.

Furthermore, the control system features input windows 64, via which an operator can, for example, select a particular quantity of water, variety of tea and perhaps a brewing time. On the basis of the production parameters influencing the flavor and effective ingredients of the beverage, the control system sets the correct brewing time or the path followed by screen basket 3 inside tank 2. It is, of course, also possible for operating personnel to configure or program individual settings in addition to selecting menu items stored in the control system.

The control system may also be equipped with a cleaning program for cleaning tank 2 and screen basket 3.

Screen basket 3 is detachable and can be removed for cleaning, and can also be replaced by screen baskets of other designs for different uses, for example for making soup and tea or for operation with loose infusion material or infusion material in sachets. Various inserts may sometimes be used in screen basket 3 to good effect, to allow optimum adaptation to suit different sachets or loose material.

Figure 5:
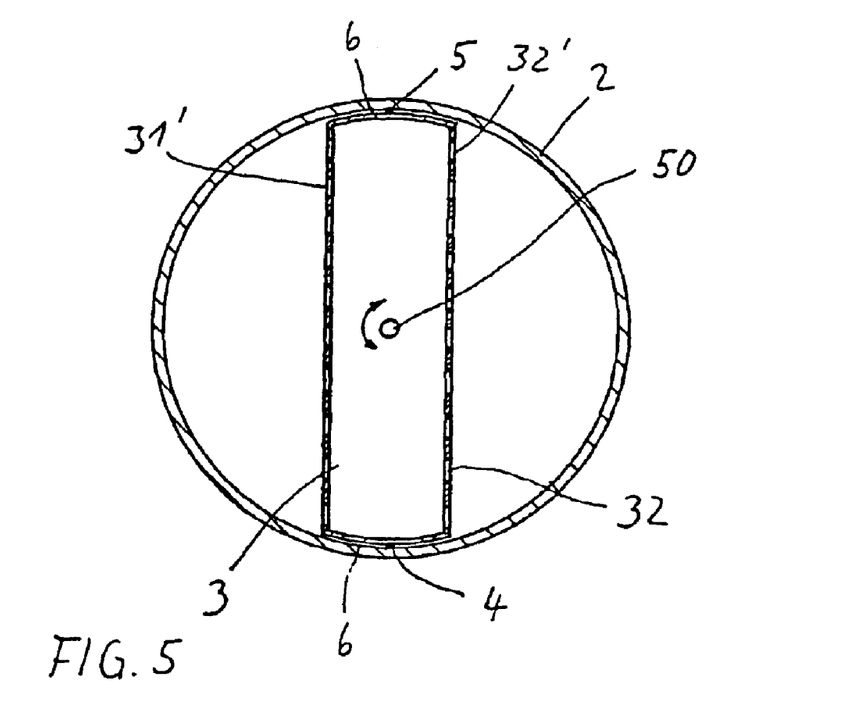
FIG. 5 shows a container with an alternative screen basket and movement mechanism.

FIG. 5 shows a further alternative to the model as per FIG. 1, seen from above. Here, the screen basket 3, which is of different design, turns around a rotational axis 50, and may be motor-driven. The direction of rotation can be alternating or constant. There is a seal 4 and 5 between the tank 2 and the screen basket 3 to ensure that the main flow of liquid passes through screen basket 3 with the corresponding apertures 31' and 32'. Seals 4 and 5 are arranged one above the other. If the gap 6 is small enough, seals 4 and 5 may not be necessary.

Figure 6A:
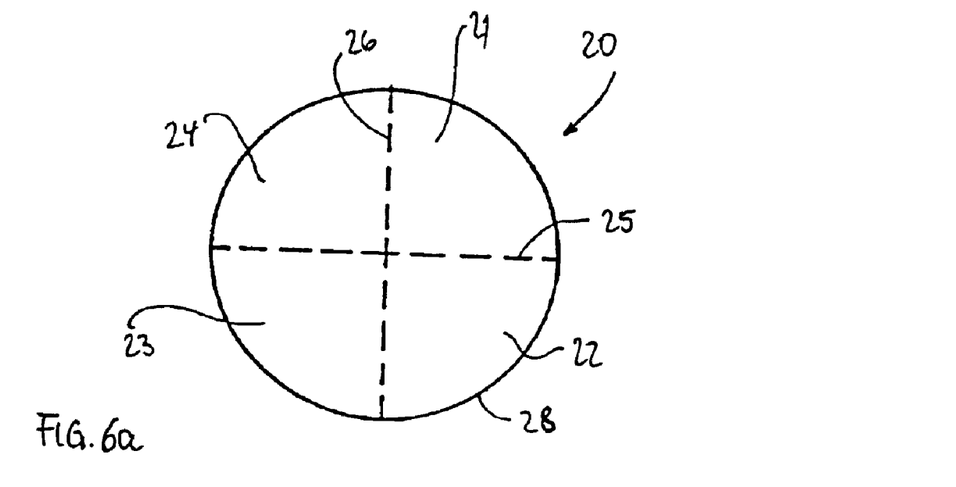
FIG. 6a, 6b shows a top view and a cross-section of an infusion sachet respectively
Figure 6B:
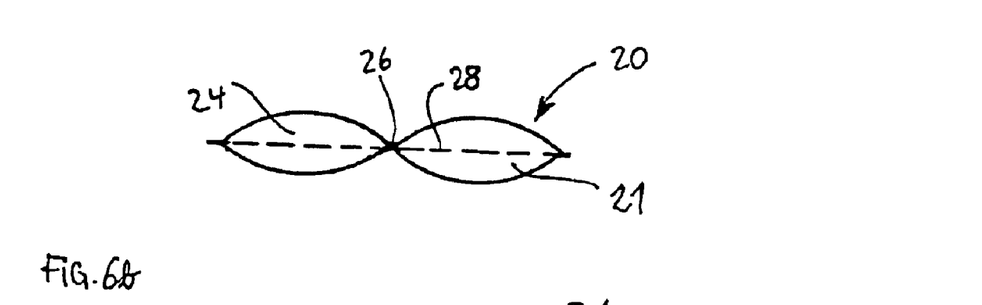

FIGS. 6a and 6b show a top view and a cross-section of a possible sachet 20 for infusion material, e.g. Tea. As an example, the sachet 20 is here divided into four chambers 21 to 24 of equal size. Sachets could also have more or fewer chambers and these could also be unequal in size.

Chambers 21 to 24 are separated by seams 25, 26 or perforations or adhesion or pressing. Each of the chambers 21 to 24 should for preference be filled with the same amount of infusion material. Alternatively, each of the chambers 21 to 24 may contain a different tea, for example in order to produce a popular new trend flavor. Thus, the device allows very simple and flexible production of sachets 20 with varying materials in chambers 21 to 24.

A further development could be distribution of chambers 21 to 24 in areas or sectors over the surface of the sachet. Chambers 21 to 24 ensure that the infusion material is distributed homogeneously, thus enabling efficient exploitation, for example of tea leaves. The chambers need not be completely separate. It suffices to ensure that the infusion material, e.g. The tea, remains in its chamber during the brewing process.

If, for example, the chambers are separated by a perforation, individual chambers from 21 to 24 can be detached from the sachet 20 and adapted to the size of a basket 3 or to the size required for the individual brew. In the same way, chambers can be removed from several sachets 20 and arranged in a basket 3 (see FIG. 3) with corresponding subdivisions 37, 38. This allows great flexibility in the selection and the quantity produced. FIG. 6b indicates one alternative for the division 28. Sachet 20 can also be designed to separate along division 28 if chambers 21 to 24 also have one or two material walls along their center, so that the infusion material is portioned well and can easily be adapted to suit the liquid quantity.

The sachet 20 itself should for preference be of an easily permeable material, e.g. Fleece or a netting material or paper or a cellulose product. Sachet 20 renders the emptying of the basket 3 (see FIG. 1) easy. Naturally, the sachet can also have more or fewer such seams 25, 26, depending on the nature of the infusion material and what is required to ensure optimum flow around and through the infusion material. Of course, the sachets could also be square in shape.

One of the main advantages of the infusion device and the infusion sachet described here is that they facilitate the preparation of drinks made by the infusion method (chiefly coffee or tea) in companies with small catering systems. It allows automatic production of beverages of high-quality, for example tea, and particularly green tea, while preserving a very high cost-benefit ratio and with optimum exploitation of tea leaves and is thus suited for use in small catering systems. The perfect cup/pot of tea of any variety or any other beverage produced by infusion can be made under the optimum conditions for that specific beverage (water temperature, also with changing temperatures and or brewing time and or flow of liquid through the infusion material as required).

In addition, the device can be constructed for use not only in the catering trade (10 liters) but also for household and office use (1 to 2 liters). In particular, it is revolutionary in that it makes the preparation of green tea or herbal teas, hitherto a complicated process, simple and convenient.

The device can also be used to make coffee or filter coffee or other beverages made by adding water or infusion. In comparison with the percolation process by which filter coffee is traditionally made, this method has the advantage of a much higher cost-benefit ratio and better aroma development, which means that less ground coffee is required and that the coffee produced has a better flavor. The process is also extremely simple, quick and convenient.

In order to produce various kinds of beverage, for example different teas, a machine of this type could be linked with various kinds of storage container. Once one sort of tea has been made, it is poured into the appropriate storage container, where it can be kept warm until it is required. The same can be done with the next type of tea and further storage containers.

It goes without saying that other models than those shown and described are covered by the present application. It could, for example, be advantageous to design the sachet used so that it can be refilled by the user, which would mean that a selected quantity of loose infusion material could be used. The sachet could then be fitted with a conventional means of closing. It may, however, suffice to simply fold over a flap to close the sachet sufficiently, particularly if the sachet is to be placed in the basket described above.

Figure 7:
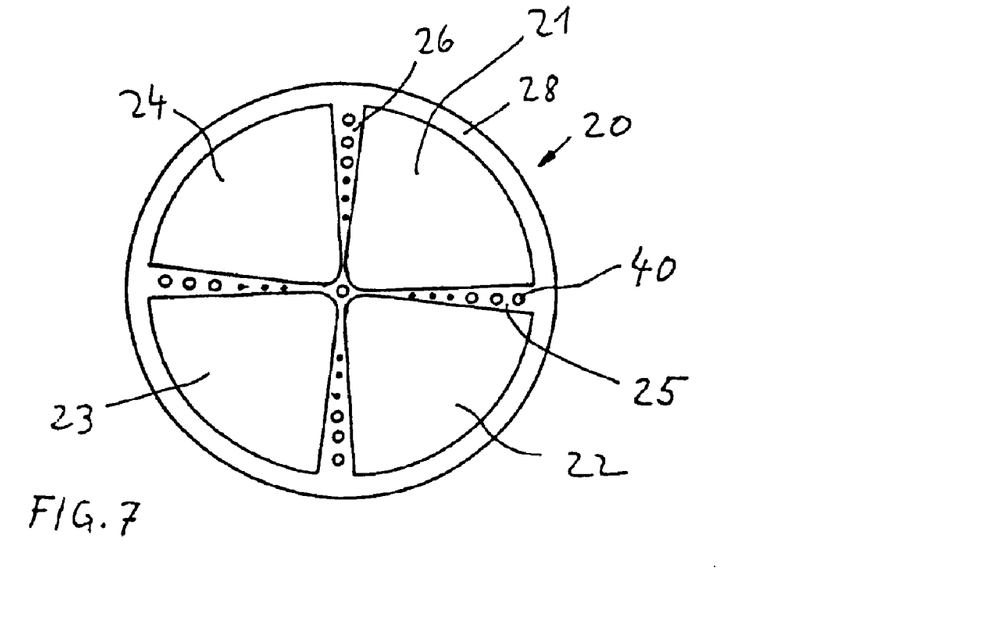
FIG. 7 shows a further infusion sachet with permeation apertures

The sachet 20 may have apertures 40 (FIG. 7) which allow liquid to pass directly through the sachet 20 when the basket 3 moves, without coming into direct contact with the infusion material. This can lead to increased liquid swirling which in turn means improved exploitation of the infusion material. It also means that there is less strain on the drive mechanism of the basket 3, as the resistance offered by basket 3 plus sachet 20 and infusion material is lower than that offered by a sachet 20 without apertures 40.

In particular, the individual production steps for making beverages and the preparation of the machine for the next beverage required can be automated for use in, for example, canteens or offices. In order to do this, it would be necessary, or at least advantageous, to place the sachet 20 of the material for the infusion in the screen basket 3, either manually or automatically, and to dispose of it automatically once the beverage has been made, for example by ejecting it automatically into a waste bin. The beverage can then be produced using the method and the device which are the subject can the method and the device which are the subject of this application.

The process described above, where tea or other specific beverages were named, can of course also be applied to the production of any other drink produced by the addition of water, that is to say cold drinks, other drinks, soups etc.

What is claimed is:

1. A device for production of beverages wherein liquid is added to an infusion material to make the beverage, said device comprising;
   a tank configured for introduction of the liquid into an interior volume of said tank;
   a screen basket movably disposed within said tank, said screen basket configured for receipt of the infusion material;
   said screen basket sized with respect to said tank such that a relatively small gap is defined between said screen basket and an inside wall of said tank, said gap having dimensions such that upon movement of said screen basket within said tank, substantially all of the liquid within said tank is caused to flow through said screen basket for permeation of the liquid and infusion material; and
   a drive system attached to said screen basket for moving said screen basket in said tank in first and second directions, and a programmable control system configured with said drive system to automatically adjust the height of said screen basket within said tank as a function of liquid level within said tank.

2. The device as in claim 1, wherein said screen basket is vertically movable within said tank.

3. The device as in claim 1, wherein said screen basket is rotatably movable within said relative to a vertical axis.

4. The device as in claim 1, further comprising a sealing device disposed in said gap around a circumference of said screen basket.

5. The device as in claim 1, wherein said screen basket comprises generally impermeable side walls and a permeable floor.

6. The device as in claim 5, wherein said screen basket further comprises a permeable lid.

7. The device as in claim 1, wherein said screen basket is compartmentalized.

8. The device as in claim 7, wherein said screen basket comprises a plurality of compartments in a horizontal plane for simultaneous movement in a vertical plane.

9. The device as in claim 7, wherein said screen basket comprises a plurality off vertically aligned compartments.

10. The device as in claim 1,
    wherein said screen basket is rotationally movable within said tank and comprises permeable side walls.

11. The device as in claim 1, wherein said control system is configured for controlling production of the beverage as a function of any combination of quantity of liquid within said tank, temperature of liquid within said tank, type of infusion material, and infusion time of the liquid and infusion material.

12. The device as in claim 1, wherein said screen basket is vertically movable within said tank and upward movement of said screen basket is limited such that for a given quantity of liquid in said tank, a floor of said screen basket is generally at an upper surface level of the liquid at an upper reversing point of movement of said screen basket.

13. The device as in claim 12, wherein an upper edge of said screen basket is located above the upper surface of the liquid within said tank at a lower reversing point of movement of said screen basket.

14. The device as in claim 1, further comprising at least one sensor disposed so as to detect movement of said screen basket within said tank.

15. The device as in claim 1, further comprising a heating system configured generally at a bottom of said tank for heating the liquid within said tank.

16. The device as in claim 1, further comprising at least one temperature sensor disposed to monitor temperature of the liquid in said tank.

17. The device as in claim 1, wherein said tank comprises a sealable lid.

18. A device for production of beverages wherein liquid is added to an infusion material to make the beverage, said device comprising;
 a tank configured for introduction of the liquid into an interior volume of said tank;
 a screen basket movably disposed within said tank, said screen basket configured for receipt of the infusion material;
 said screen basket sized with respect to said tank such that a relatively small gap is defined between said screen basket and an inside wall of said tank, said gap having dimensions such that upon movement of said screen basket within said tank, substantially all of the liquid within said tank is caused to flow through said screen basket for permeation of the liquid and infusion material;
 a drive system attached to said screen basket for moving said screen basket in said tank; and
 wherein said drive system comprises a water-operated hydraulic system.

19. The device as in claim 18, wherein said water-operated hydraulic system is connectable to a water main supply.

20. A device for production of beverages wherein liquid is added to an infusion material to make the beverage, said device comprising;
 a tank configured for introduction of the liquid into an interior volume of said tank;
 a screen basket movably disposed within said tank, said screen basket configured for receipt of the infusion material;
 said screen basket sized with respect to said tank such that a relatively small gap is defined between said screen basket and an inside wall of said tank, said gap having dimensions such that upon movement of said screen basket within said tank, substantially all of the liquid within said tank is caused to flow through said screen basket for permeation of the liquid and infusion material; and
 further comprising a cooling system configured generally near a top of said tank for cooling liquid within said tank.

21. A device for production of beverages wherein liquid is added to an infusion material to make the beverage, said device comprising;
 a tank configured for introduction of the liquid into an interior volume of said tank;
 a screen basket movably disposed within said tank, said screen basket configured for receipt of the infusion material;
 said screen basket sized with respect to said tank such that a relatively small gap is defined between said screen basket and an inside wall of said tank, said gap having dimensions such that upon movement of said screen basket within said tank, substantially all of the liquid within said tank is caused to flow through said screen basket for permeation of the liquid and infusion material;
 wherein said tank comprises a sealable lid; and
 further comprising a sensor disposed so as to monitor the position of said lid.

22. A device for production of beverages wherein liquid is added to an infusion material to make the beverage, said device comprising;
 a tank configured for introduction of the liquid into an interior volume of said tank;
 a screen basket movably disposed within said tank, said screen basket configured for receipt of the infusion material;
 said screen basket sized with respect to said tank such that a relatively small gap is defined between said screen basket and an inside wall of said tank, said gap having dimensions such that upon movement of said screen basket within said tank, substantially all of the liquid within said tank is caused to flow through said screen basket for permeation of the liquid and infusion material; and
 further comprising at least one sensor disposed to monitor a quantity of liquid within said tank by measuring a weight of said tank.

23. The device as in claim 22, wherein said sensor comprises a strain gauge.

24. A process for producing beverages by the addition of a liquid to an infusion material within a tank, said process comprising:
 adding the infusion material to a screen basket that is movable within the tank;
 adding a predetermined measured amount of liquid to the tank and subsequently heating or cooling the liquid within the tank to a desired temperature;
 after the liquid has reached the desired temperature, moving the screen basket containing the infusion material within the tank according to a program of an automatic control system for a predetermined infusion time as a function of type of infusion material and amount of liquid within the tank, the liquid within the tank passing through the screen basket as the basket is moved; and
 after said predetermined infusion time, moving the screen basket to a position within the tank such that the infusion material within the screen basket is out of contact with the beverage within the tank.

25. The process as in claim 24, wherein a movement of the screen basket within the tank is further controlled by the control system as a function of liquid temperature.

26. The process as in claim 24, further comprising storing the beverage within the tank for subsequent dispensing from the tank after the infusion time, monitoring temperature of the beverage within the tank during storage and dispensing, and activating heating or cooling elements to maintain the beverage at a desired temperature.

27. The process as in claim 24, further comprising storing the beverage within the tank for subsequent dispensing from the tank after the infusion time, and monitoring quantity of the beverage in the tank during storage and dispensing.

28. The process as in claim 24, wherein the screen basket is moved out of the liquid after the infusion time, and a signal is automatically generated indicating that the beverage is complete.

29. The process as in claim 28, wherein time remaining for the infusion time is monitored and displayed.

30. A process for producing beverages by the addition of a liquid to an infusion material within a tank, said process comprising:

adding the infusion material to a screen basket that is movable within the tank;

adding a predetermined measured amount of liquid to the tank and subsequently heating or cooling the liquid within the tank to a desired temperature;

after the liquid has reached the desired temperature, moving the screen basket containing the infusion material within the tank for a predetermined infusion time as a function of type of infusion material and amount of liquid within the tank, the liquid within the tank passing through the screen basket as the basket is moved; and comprising determining the quantity of liquid within the tank by weighing the tank with liquid with a weight measuring device that has been adjusted for zero weight with the tank empty.

31. A process for producing beverages by the addition of a liquid to an infusion material within a tank, said process comprising:

adding the infusion material to a screen basket that is movable within the tank;

adding a predetermined measured amount of liquid to the tank and subsequently heating or cooling the liquid within the tank to a desired temperature;

after the liquid has reached the desired temperature, moving the screen basket containing the infusion material within the tank for a predetermined infusion time as a function of type of infusion material and amount of liquid within the tank, the liquid within the tank passing through the screen basket as the basket is moved; and wherein the tank has a sealable lid, and further comprising monitoring the position of the lid such that the liquid in the tank cannot be heated unless the lid is in a closed position.

32. A process for producing beverages by the addition of a liquid to an infusion material within a tank, said process comprising:

adding the infusion material to a screen basket that is movable within the tank;

adding a predetermined measured amount of liquid to the tank and subsequently heating or cooling the liquid within the tank to a desired temperature;

after the liquid has reached the desired temperature, moving the screen basket containing the infusion material within the tank for a predetermined infusion time as a function of type of infusion material and amount of liquid within the tank, the liquid within the tank passing through the screen basket as the basket is moved; and comprising moving the basket within the tank with a water-operated hydraulic system.

* * * * *